United States Patent
Eckert et al.

(10) Patent No.: US 7,644,949 B2
(45) Date of Patent: Jan. 12, 2010

(54) AIRBAG MODULE ASSEMBLY

(75) Inventors: Nick Eckert, Berlin (DE); Patrick Isermann, Berlin (DE); Milan Bachraty, London (GB); Matthias Liebetrau, Falkensee (DE); Frank Sauer, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/798,337

(22) Filed: May 11, 2007

(65) Prior Publication Data

US 2007/0267850 A1      Nov. 22, 2007

Related U.S. Application Data

(63) Continuation of application No. PCT/DE2005/002050, filed on Nov. 14, 2005.

(30) Foreign Application Priority Data

| Nov. 15, 2004 | (DE) | .................. | 10 2004 055 657 |
| Nov. 16, 2004 | (DE) | .................. | 10 2004 056 128 |
| Jun. 3, 2005 | (DE) | .................. | 20 2005 009 002 |
| Jun. 3, 2005 | (DE) | .................. | 20 2005 010 863 |
| Jul. 5, 2005 | (DE) | .................. | 20 2005 010 864 |

(51) Int. Cl.
   *B60R 21/20* (2006.01)
(52) U.S. Cl. .................................. 280/728.2; 280/732
(58) Field of Classification Search ............. 280/728.1, 280/728.2, 731, 732
   See application file for complete search history.

(56) References Cited

U.S. PATENT DOCUMENTS

| 3,712,568 | A | * | 1/1973 | Grasso et al. ............... 244/148 |
| 5,096,222 | A | * | 3/1992 | Komerska et al. ........... 280/732 |
| 5,140,799 | A | | 8/1992 | Satoh |
| 5,184,843 | A | * | 2/1993 | Berger et al. .............. 280/728.2 |
| 5,344,182 | A | * | 9/1994 | Lauritzen et al. .......... 280/728.2 |
| 5,378,011 | A | * | 1/1995 | Rogerson et al. .......... 280/728.1 |
| 5,421,607 | A | * | 6/1995 | Gordon ..................... 280/728.2 |
| 5,447,329 | A | | 9/1995 | Hamada |
| 5,558,362 | A | | 9/1996 | Acker et al. |
| 5,692,606 | A | | 12/1997 | Elmaleh |
| 5,772,241 | A | | 6/1998 | Heilig |
| 5,791,682 | A | | 8/1998 | Hiramitsu et al. |

(Continued)

FOREIGN PATENT DOCUMENTS

CN          1133243 A          10/1996

(Continued)

*Primary Examiner*—Ruth Ilan
(74) *Attorney, Agent, or Firm*—Foley & Lardner LLP

(57) ABSTRACT

A module assembly for an airbag device for protecting occupants of motor vehicles includes a carrier for the assembly, an inflatable airbag packet, a flexible protective envelope, and a fixing mechanism. The airbag packet is fixed to the carrier. The airbag packet is accommodated in the flexible protective envelope. The protective enveloped can be closed off in a gastight manner. The fixing mechanism fixes the airbag packet to the carrier. The fixing mechanism includes a holding element. The holding element, which includes a securing mechanism provided on the carrier to fix the airbag packet to the carrier, extends along an edge of the airbag packet. The securing mechanism is formed integrally on the carrier and is resiliently pivotable with respect to a lateral section of the carrier. Alternatively, the securing mechanism is fixed on the carrier as a separate assembly.

24 Claims, 7 Drawing Sheets

U.S. PATENT DOCUMENTS

| | | |
|---|---|---|
| 5,921,575 A | 7/1999 | Kretschmer et al. |
| 6,115,998 A | 9/2000 | Reh et al. |
| 6,250,675 B1 | 6/2001 | Dietsch et al. |
| 6,260,330 B1 | 7/2001 | Borowski et al. |
| 6,305,150 B1 | 10/2001 | Dietsch |
| 6,328,332 B1 | 12/2001 | Schütz |
| 6,367,835 B1 * | 4/2002 | Maguire .................. 280/728.2 |
| 6,588,179 B2 | 7/2003 | Haley et al. |
| 6,616,587 B2 | 9/2003 | Kleeberger et al. |
| 6,619,015 B2 | 9/2003 | Arwood et al. |
| 6,718,725 B2 | 4/2004 | Farwig et al. |
| 6,824,163 B2 * | 11/2004 | Sen et al. ................. 280/728.2 |
| 7,431,330 B2 | 10/2008 | Korechika |
| 2001/0048216 A1 | 12/2001 | Varcus et al. |
| 2002/0135160 A1 | 9/2002 | Lorenz |
| 2003/0052480 A1 | 3/2003 | Bohn |
| 2004/0239085 A1 | 12/2004 | Vitet |
| 2007/0108752 A1 | 5/2007 | Eckert et al. |

FOREIGN PATENT DOCUMENTS

| | | |
|---|---|---|
| DE | 41 41 617 A1 | 7/1992 |
| DE | 91 01 099 U1 | 7/1992 |
| DE | 694 10 870 T3 | 10/1994 |
| DE | 694 21 638 T2 | 10/1994 |
| DE | 44 19 565 A1 | 3/1995 |
| DE | 43 40 999 A1 | 6/1995 |
| DE | 44 15 374 A1 | 11/1995 |
| DE | 296 06 830 U1 | 9/1996 |
| DE | 195 35 564 A1 | 3/1997 |
| DE | 297 05 753 U1 | 7/1997 |
| DE | 298 15 940 U1 | 11/1998 |
| DE | 100 20 677 A1 | 10/2001 |
| DE | 101 14 208 A1 | 5/2002 |
| DE | 10 2004 056 128 A1 | 1/2007 |
| EP | 0 620 140 | 3/1994 |
| EP | 0 620 139 A1 | 10/1994 |
| EP | 0 620 139 B1 | 10/1994 |
| EP | 1 314 618 A2 | 5/2003 |
| EP | 1 464 551 A1 | 10/2004 |
| EP | 1 506 896 A1 | 2/2005 |
| GB | 2 349 618 A | 11/2000 |
| GB | 2 371 025 A | 7/2002 |

* cited by examiner

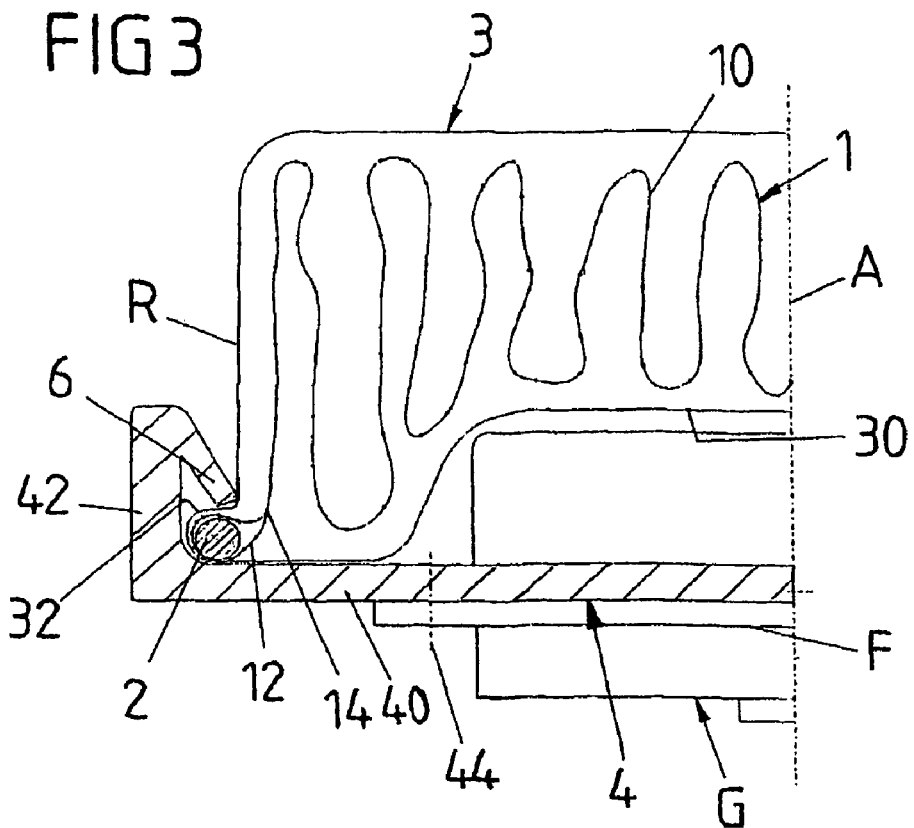
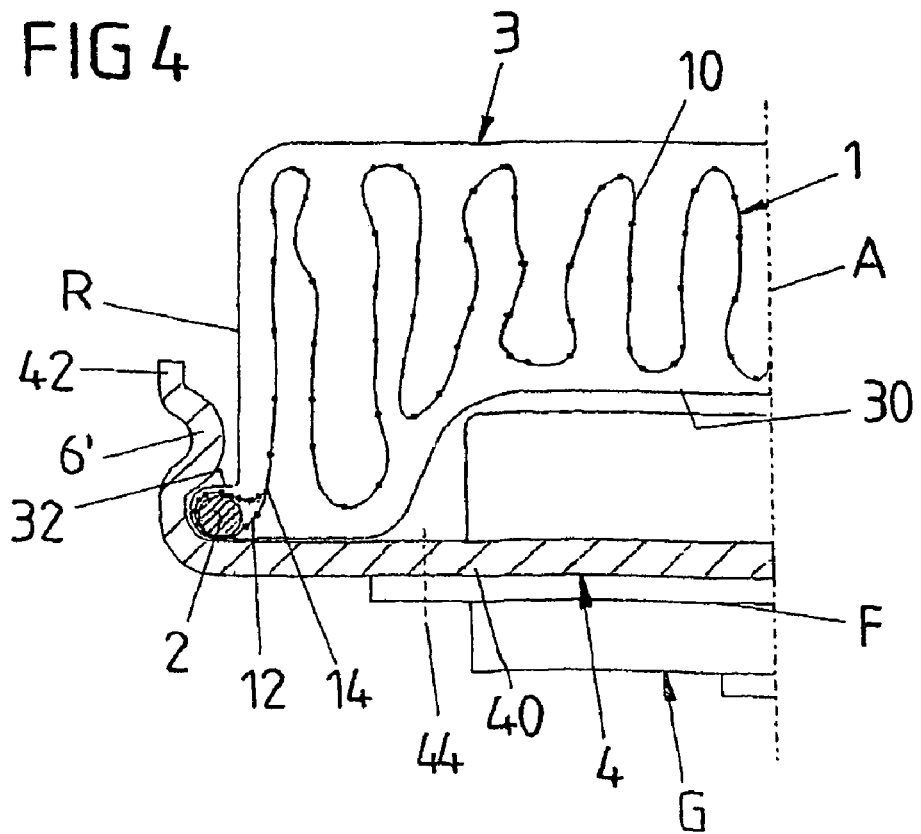

FIG 6
FIG 7
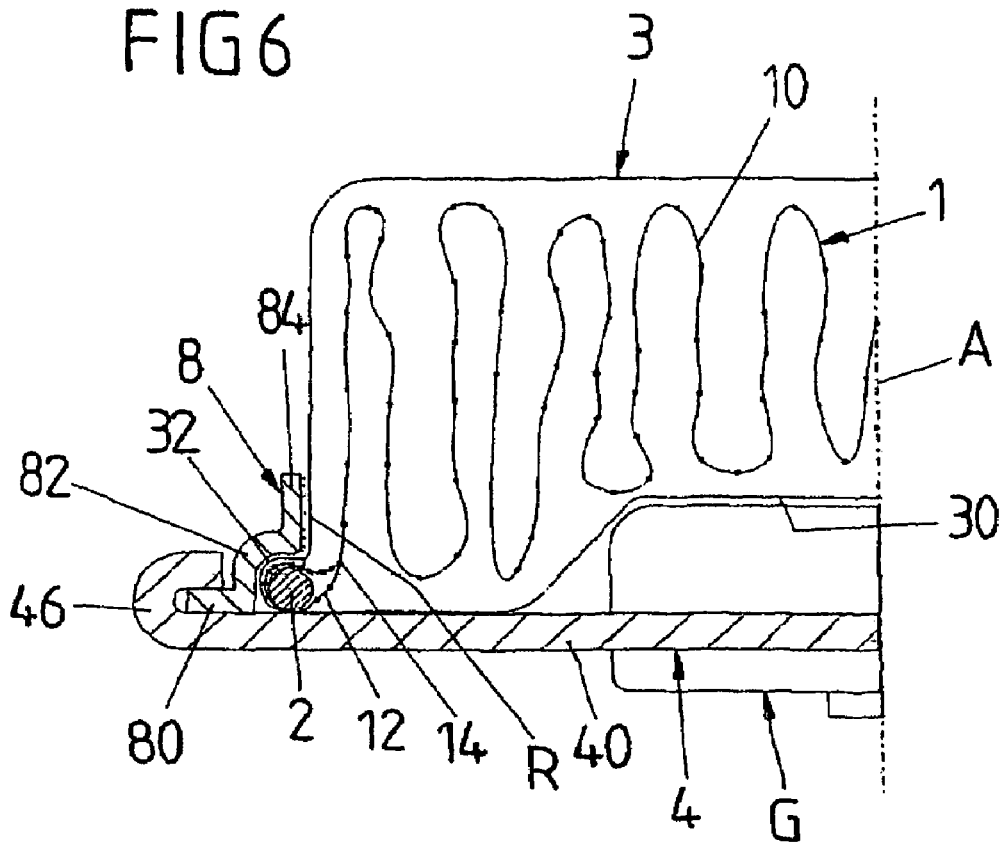
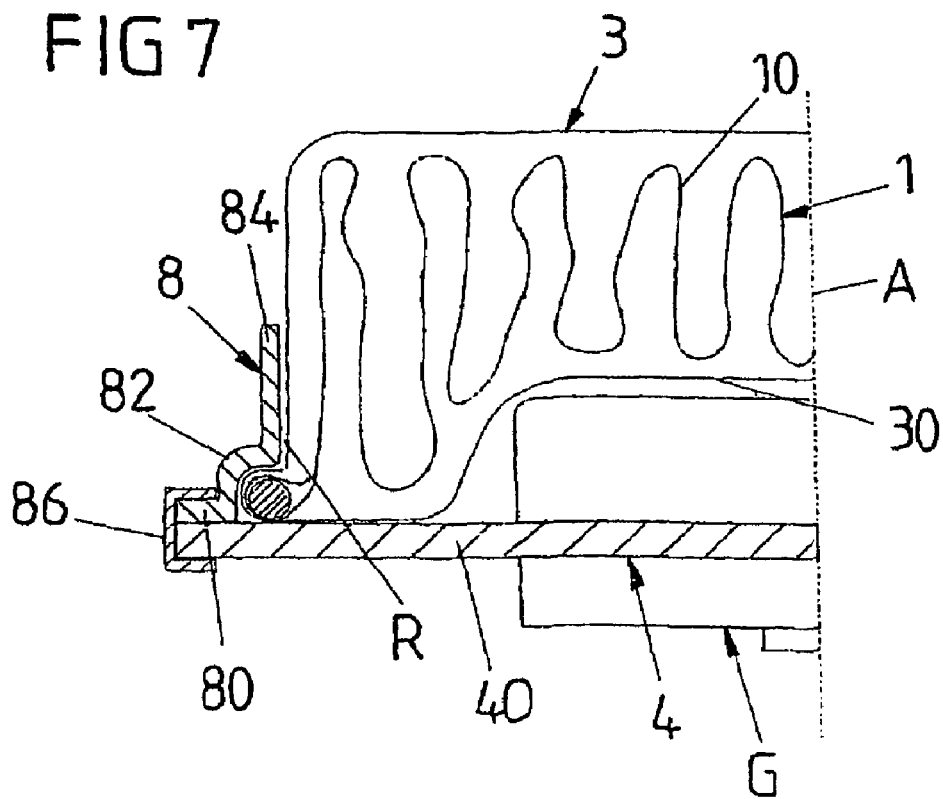

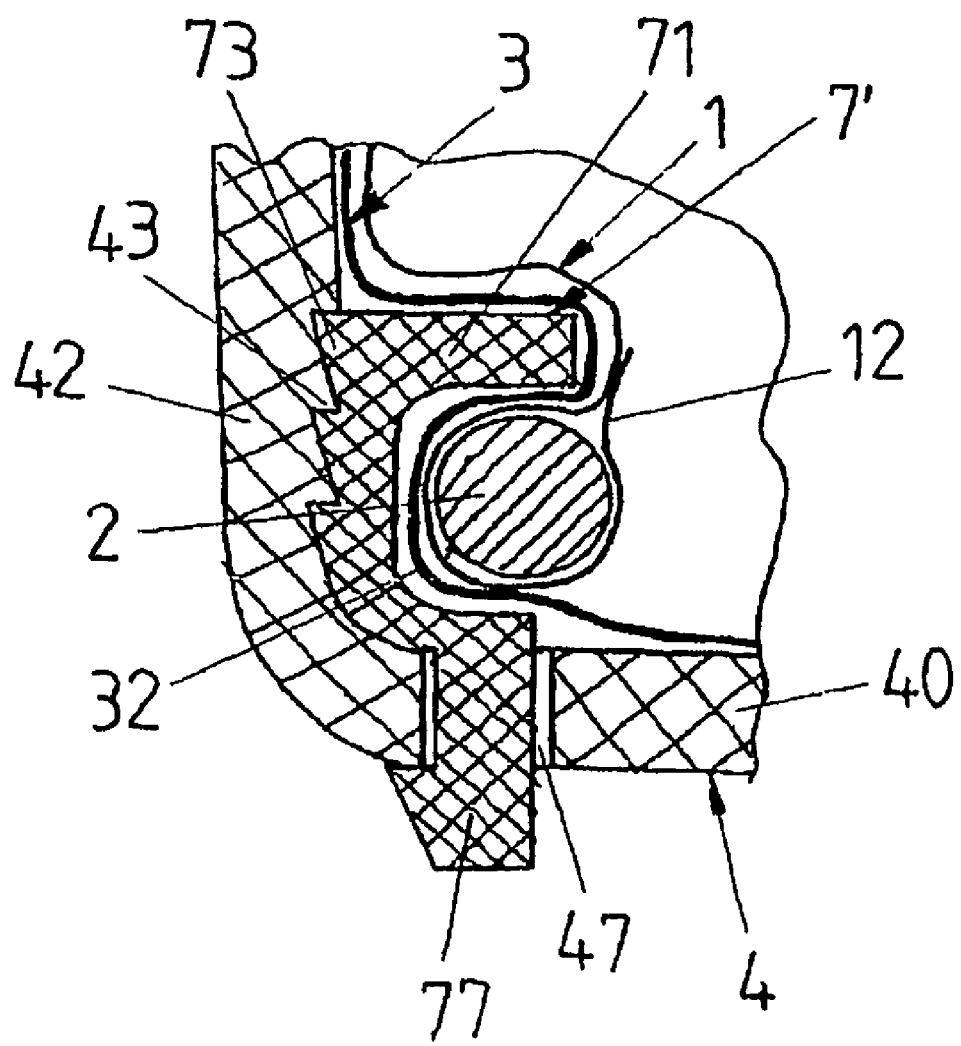

AIRBAG MODULE ASSEMBLY

CROSS-REFERENCE TO RELATED PATENT APPLICATIONS

This application is a continuation of International Application PCT/DE 2005/002050,which has an international filing date of Nov. 14, 2005; this International Application was not published in English, but was published in German as WO 2006/050719, both of which are incorporated by reference herein in their entirety.

BACKGROUND

The invention relates to a module assembly for an airbag device for protecting occupants of a motor vehicle.

A module assembly can include an airbag packet, for example for a driver or passenger airbag, which can be inflated to protect a vehicle occupant and is delimited by an encircling outer edge. The airbag packet is formed by an airbag which has been folded up, unfolds when it is inflated and in the inflated state forms a cushion by which the occupant to be protected is to be protected from injury in the event of a crash, and which is arranged in the folded state as an airbag packet in a flexible protective envelope which surrounds (closes off) the airbag packet in a gastight manner. This allows the package dimensions of the airbag packet to be minimized by generating a subatmospheric pressure in the flexible protective envelope (which is ultimately to be closed off in a gastight manner). DE 101 14 208 A1 and DE 10 2004 056 128,both of which are incorporated by reference herein in their entirety, disclose various module assemblies. A module assembly may also comprise a carrier, to which the airbag is fixed so that the airbag packet adopts a defined position within the corresponding motor vehicle.

SUMMARY

One exemplary embodiment relates to a module assembly for an airbag device for protecting occupants of motor vehicles. The module assembly comprises a carrier for the module assembly, an airbag packet which can be inflated to protect a vehicle occupant, a flexible protective element, and a mechanism to fix the airbag packet to the carrier. The airbag packet is accommodated in the flexible protective envelope. The protective enveloped is closed off in a gastight manner. The mechanism to fix the airbag packet to the carrier includes a holding element. The holding element, which includes a securing mechanism provided on the carrier to fix the airbag packet to the carrier, extends along an edge of the airbag packet. The securing mechanism is formed integrally on the carrier and is resiliently pivotable with respect to a lateral section of the carrier, or the securing mechanism is fixed on the carrier as a separate assembly.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 shows a second modification to the exemplary embodiment shown in FIG. 1.

FIG. 4 shows a third modification to the exemplary embodiment shown in FIG. 1.

FIG. 5b shows a plan view of an excerpt from the arrangement shown in FIG. 5a.

FIG. 6 shows a fifth modification to the exemplary embodiment shown in FIG. 1.

FIG. 7 shows a sixth modification to the exemplary embodiment shown in FIG. 1.

FIG. 10 shows an excerpt of a further variant for fixing the airbag packet along its outer edge to a carrier of the module assembly.

DETAILED DESCRIPTION

Figure 1:
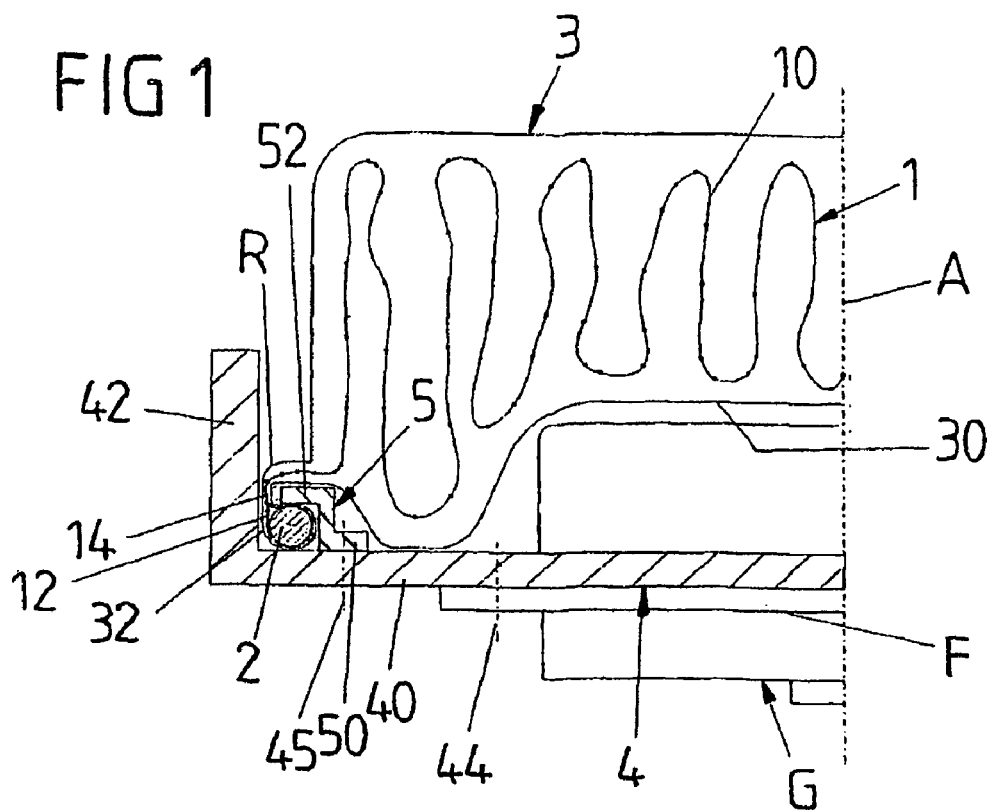
FIG. 1 shows a cross section through a module assembly for an airbag device of a motor vehicle with an airbag packet which is arranged in a protective envelope and is fixed along its outer edge to a carrier of the module assembly.

Exemplary embodiments disclose particular features which occur when surrounding a folded airbag packet with a flexible envelope (film), reduced to minimum package dimensions by use of subatmospheric pressure. The flexible envelope being closed in a gastight manner in order to achieve the subatmospheric pressure. Embodiments also disclose the possibility of generating and maintaining a subatmospheric pressure during and after the manufacture of the airbag packet surrounded in a gastight manner by the envelope being taken into account above all.

According to a first embodiment, a holding element, which to fix the airbag packet is engaged over (or engaged around) by a securing mechanism provided on the carrier, extends along at least part of the outer edge of the airbag packet, so that the airbag packet is fixed to the carrier by way of the holding element and the carrier-side securing mechanism.

The structure of the first embodiment can provide an easier way to fix the airbag packet to the carrier, by the airbag-side holding element being brought into engagement with the carrier-side securing mechanism. The holding element is in this case arranged together with the airbag packet in the protective envelope (preferably formed by a film), which holds the airbag packet together in a gastight manner and with minimum package dimensions. For this purpose, the holding element is suitably connected to the airbag packet, for example by being arranged in a loop of the airbag packet. This is preferably a closed loop which the holding element engages around along a ring-like curve that is completely closed in cross section and which may be formed, for example, by two airbag sections being joined to one another. Suitable ways of joining the two airbag sections include, for example, sewing, interweaving or adhesive bonding, or any other suitable method.

The holding element can in a simple way be formed by a holding ring which runs in the shape of a ring around the outer edge of the airbag packet and which may either be a completely closed ring or a ring which is interrupted at one or more locations, in order to facilitate fitting by threading into associated securing mechanism. As an alternative to the holding element being designed as a holding ring, it may also be formed, for example, by a holding plate.

Suitable materials for the holding element are in particular metal (sheet metal) or plastic, or any other suitable material.

In one embodiment, the holding element is under elastic preloading such that it tends to engage in the associated securing mechanism on the carrier.

The securing mechanisms are preferably designed in such a manner that they engage around the airbag-side holding element, if appropriate together with the carrier of the module assembly.

The securing mechanism may either be formed integrally on the carrier or fixed to it as a separate assembly. By way of example, securing bolts for forming a screw or rivet connection, clamping elements for forming a clamp connection or a material rearrangement (overturned flange) on the carrier are suitable for fixing separate securing mechanisms to the carrier.

The separate assembly forming the securing mechanism may, for example, be securing hooks or at least one housing part which is arranged on the carrier and on which corresponding securing mechanisms are integrally formed.

Furthermore, the securing mechanism provided may be a clamping device which clamps the holding element to the carrier by mechanism of a clip, and is thereby simultaneously fixed to the carrier.

Furthermore, the securing mechanism may be fixed to the carrier by a latching mechanism, preferably on at least two latching points spaced apart from one another, in order to ensure maximum stability and reliability of the latched connection.

In the case of securing mechanisms formed integrally on the carrier, these securing mechanisms are particularly preferably formed as clip elements or latching projections.

Overall, the securing mechanisms may be designed for both positively and non-positively locking holding of the holding element; a combination of these two types of connection is also possible.

To prevent the edge portion of the airbag and/or that portion of the protective envelope which covers that edge portion of the airbag, which are received between the holding element and the associated securing mechanism and have the latter engaging over them, from being damaged, it is possible to provide a cover which is located between the holding element and the associated securing mechanism, specifically in particular between the airbag packet (including the flexible protective envelope), on the one hand, and the securing mechanism, on the other hand. An example of a suitable cover is a flexible shrink-fit tube.

According to one embodiment, a plurality of individual securing mechanisms are arranged in succession (and at a distance from one another) on the carrier along the outer periphery of the airbag packet. However, it is also conceivable for the securing mechanism on the carrier to run continuously around the outer edge of the airbag packet.

The carrier may firstly be a generator carrier (which usually consists of metal). However, the carrier may also form part of a housing (consisting of metal or plastic) for accommodating the airbag packet, in which case a section of this housing can simultaneously perform a dual function as a generator carrier.

FIG. 1 illustrates, in cross section, a module assembly for an airbag device (here by way of example a driver airbag module, which is axially symmetrical with respect to an axis A, for installation in a steering wheel) of a motor vehicle, which comprises a folded airbag, the airbag envelope of which, which has been laid in folds 10, forms an airbag packet 1. The airbag packet has been packed into a protective envelope 3 which is formed by a film 30, is closed off in a gastight manner and prevents expansion of the airbag packet 1, which has previously been compressed by mechanism of subatmospheric pressure, until it is inflated by mechanism of a gas generator G in order to protect a vehicle occupant. Under the action of the airbag packet unfolding as it inflates, the envelope 3, which is formed by a film 30, bursts, so that the airbag packet 1 can unfold.

A gas generator G (pot gas generator) which is used to inflate the airbag packet 1 is secured to the disc-like base body 40 of a carrier 4 of the module assembly via a generator flange F in a known way using suitable connecting mechanism 44, for example in the form of screws or rivets; this carrier 4 therefore serves as a generator carrier and at the outer periphery has a lateral end section 42 which is angled off (substantially at right angles) and engages around the airbag packet 1 in the shape of a ring. In addition to screws or rivets, it is also possible for other elements to be used as connecting mechanism 44 for securing the gas generator G to the carrier 4 via the generator flange F, for example a bayonet closure, the components of which are arranged, in particular formed integrally, on the generator flange F, on the one hand, and on the carrier 4, on the other hand. This opens up the possibility of direct integration of the joining mechanism in the components F, G, and 4 which are to be secured to one another, so that there is no need whatsoever for separate, additional joining mechanism.

The airbag packet 1 is likewise secured to the carrier 4 and for this purpose has a holding ring 2, which runs around its outer edge R, as holding element which lies inside the film-like protective envelope 3 in an annularly continuous loop 12 at the outer edge R of the airbag packet 1. The loop 12, surrounded by a section 32 of the protective envelope 3, at the outer edge R of the airbag packet 1 is formed by two airbag sections being fixedly joined to one another in a suitable way, for example by sewing, interweaving or adhesive bonding, at a joining location 14 so as to produce the loop 12.

The holding ring 2 runs in the form of a ring around the outer edge R of the airbag packet 1 within the loop 12, so that it completely surrounds the airbag packet 1 in the form of a ring.

The holding ring 2 is assigned securing mechanism 5 on the carrier 4, which are formed by a plurality of securing hooks arranged in succession along the outer periphery of the carrier 4. These securing hooks lie completely both outside the airbag packet 1 and outside the protective envelope 3 which encloses the airbag packet 1. As a result, the respective bases 50, extending along the carrier 4, of the hook-like securing elements can be fixed to the carrier 4 in a simple way by securing bolts, for example to produce a screw or rivet connection. There is no risk of damaging the protective envelope 3, since the securing mechanism 5 are completely outside the protective envelope 3.

A hook-shaped securing section 52 of the securing mechanism 5 engages over the holding ring 2 together with the loop 12 of the airbag packet 1 and the envelope section 32 surrounding the loop 12. Together with the carrier 4, specifically its disc-like base body 40 and its end section 42 which is angled off from this base body 40, the securing mechanism 5 engage completely around the holding ring 2, so that the airbag packet 1 is thereby fixed to the carrier 4.

It is in this case easy to mount the airbag packet 1 on the carrier 4 by the airbag packet 1, together with the holding ring 2 arranged in the loop 12 at the outer edge R of the airbag packet 1 and the protective envelope 3, which surrounds the airbag packet 1 and the holding ring 2 and has been closed off in a gastight manner, being placed onto the carrier 4, with the angled-off lateral end section 42 of the carrier 4 surrounding the airbag packet 1. Then, the securing mechanism 5, in the form of hook-like securing elements, are fixed to the carrier 4 by suitable connecting mechanism 45, for example in the form of rivets or screws, in a position in which their respective hook-shaped securing sections 52 engage over the holding ring.

FIGS. 2 to 8 illustrate a number of modifications to the module assembly shown in FIG. 1; the modifications relate primarily to the way in which the holding ring 2 is fixed to the carrier 4. Otherwise, the module assembly illustrated in FIGS. 2 to 8 in each case corresponds to the assembly shown with reference to FIG. 1, and consequently in the text which follows it is in particular the particular way in which the airbag packet 1 is fixed to the carrier 4 via the holding ring 2 which is considered in more detail.

Figure 2:
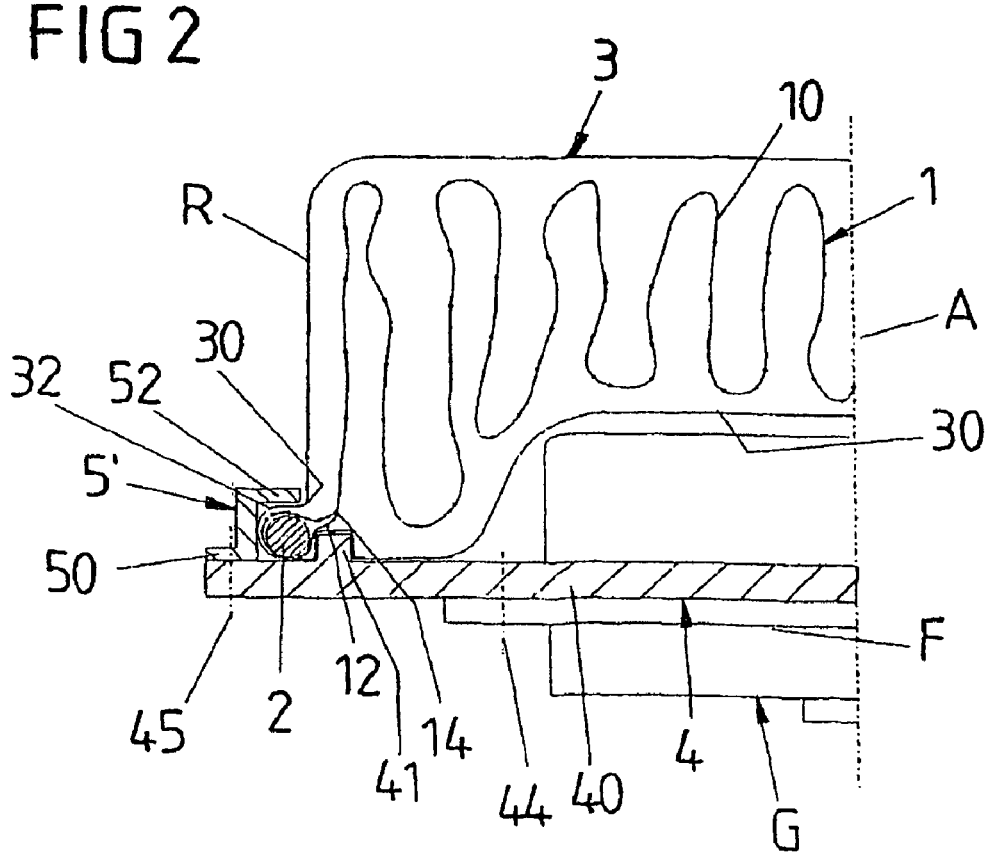
FIG. 2 shows a first modification to the exemplary embodiment shown in FIG. 1.

In the exemplary embodiment of a module assembly shown in FIG. 2, the carrier 4 does not have an angled-off lateral section 42 at the outer edge. Instead, the securing mechanism 5' in the form of hook-like securing elements arranged at the outer edge of the disc-like base body 40 of the carrier 4 form an assembly which delimits the airbag packet 1 on the radially outer side. Unlike in the exemplary embodiment shown in FIG. 1, therefore, the securing mechanisms 5—as seen in the radial direction—do not lie inside the holding ring 2, but rather lie outside it. In this case too, the securing mechanisms 5', which are formed by hook-like securing elements, engage, by way of a respective hook-like securing section 52, over the holding ring 2 which runs around the outer periphery of the airbag packet 1 in a loop 12, with the result that the airbag packet 1 is fixed to the carrier 4. The holding ring 2 is in this case if appropriate elastically preloaded outwards, so that it presses against the securing mechanisms 5' in a nonpositively locking manner.

On the side remote from the securing mechanism 5' in the radial direction, there is, in addition to the holding ring 2, a protuberance 41 (formed integrally or secured as a separate element) of the carrier 4, which is intended to prevent the holding ring 2 from being disengaged from the securing mechanisms 5' in the radially inward direction under the action of the tensile forces which occur during inflation and unfolding of the airbag packet 1.

In the exemplary embodiment of a module assembly shown in FIG. 3, at least one clip element 6, which engages over the holding ring 2 running around the outer edge R of the airbag packet 1 and in this way holds it in place in a non-positively and positively locking manner, is formed integrally on the lateral section 42 which is angled off at the outer periphery of the base body 40 of the carrier 4 and runs in the shape of a ring around the outer edge R of the airbag packet 1. The clip element 6 is designed to be resilient, in particular to pivot resiliently with respect to the lateral section 42, in such a manner that it can yield in the radial direction during mounting of the holding ring 2 by putting the airbag packet 1 and mounting ring 2 in place on the base body 40 of the carrier 4. After the holding ring 2 has been put in place on the carrier 4, the clip element 6 then snaps back into the position shown in FIG. 3, in which it engages over the holding ring 2.

In the exemplary embodiment shown in FIG. 4, as a modification to FIG. 3, a projection 6', which engages over the holding ring 2 in a positively locking manner, is formed integrally on the angled-off lateral section 42 of the carrier 4. The projection 6' may on the one hand be arranged so as to run continuously all the way around the angled-off lateral section 42 or alternatively may be formed by a plurality of projection regions which are arranged in succession in the periphery direction and are spaced apart from one another. The projection is preferably only formed on the lateral section 42 after the airbag packet 1 together with the holding ring 2 has been put in place on the carrier 4 and the airbag packet 1 and the holding ring 2 have been suitably positioned, in such a manner that the projection engages over the holding ring 2 in a positively locking manner. Alternatively, however, the projection 6' may also have been formed integrally in advance on the lateral section 42 of the carrier 4; in this case, it should be designed to be elastic, in such a manner that it allows the airbag packet 1 together with the holding ring 2 to be put in place on the carrier 4 by the projection being elastically deformed in the radially outward direction.

Both in the case of FIG. 3 and in the case of FIG. 4, it is advantageous if the holding ring 2 is preloaded outwards, in the direction of the angled-off lateral section 42 of the carrier 4, thereby assisting the holding action of the respective securing mechanism 6 and 6'.

Figure 5A:
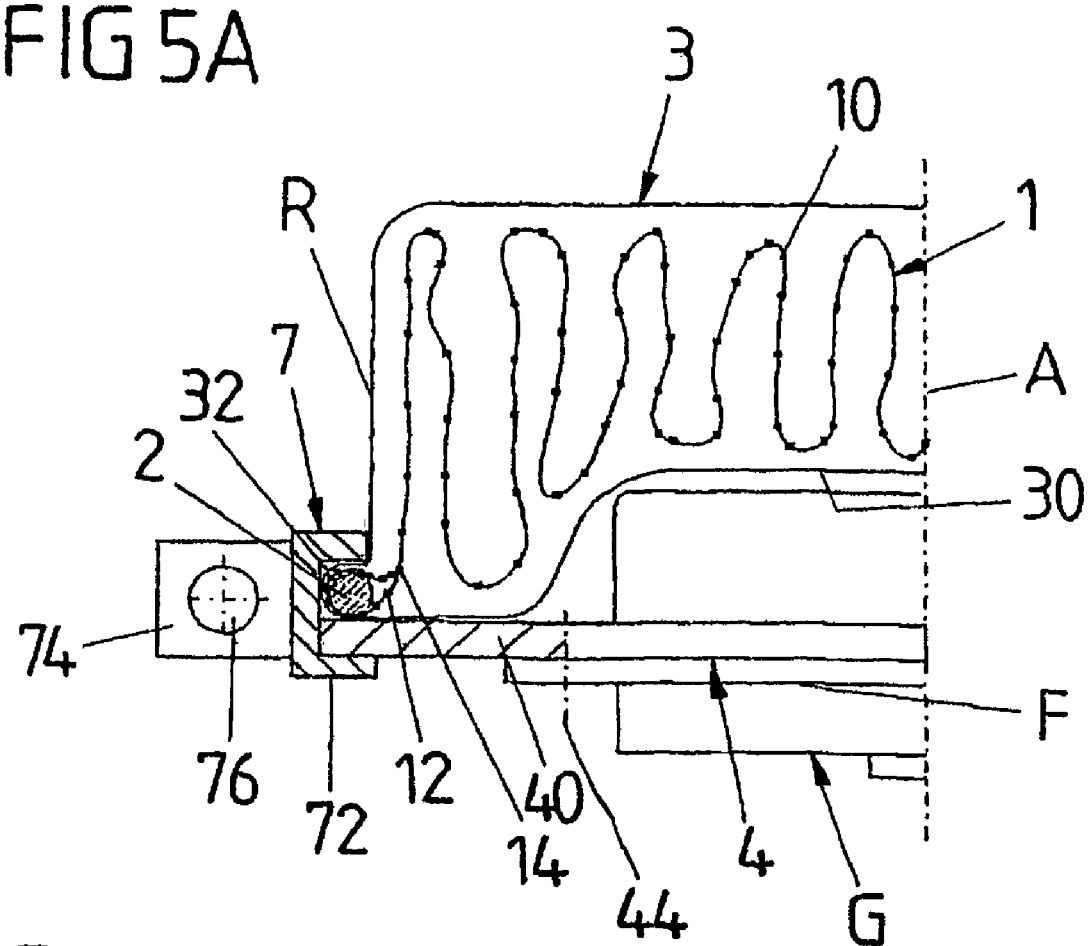
FIG. 5a shows a fourth modification to the exemplary embodiment shown in FIG. 1.
Figure 5B:
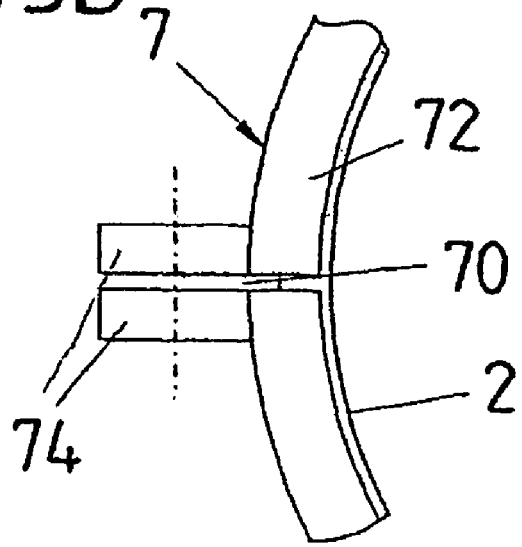

Finally, FIGS. 5a and 5b show an exemplary embodiment of a module assembly in which an (annularly encircling) clamp 72, which is provided with a slot 70 and clamps the outer edge of the base body 40 of the carrier 4 as well as the holding ring 2 together with the loop 12 formed on the airbag packet 1 and the corresponding section 32 of the protective envelope 3 together, thereby fixing the airbag packet 1 to the carrier 4, is arranged as securing mechanism 7 in the form of a clamping device at the outer periphery of the base body 40 of the carrier 4, in order to fix the airbag packet 1 to the carrier 4.

The clamping device 7 is spread open in a simple way after the airbag packet 1 has been positioned, and is pushed onto the carrier 4, so that it engages around the outer periphery of the carrier 4 and the holding ring 2 of the airbag packet 1. The clamping action is then produced in a known way by a clamping screw being introduced into a passage opening 76 in angled-off actuating sections 74 of the clamping device 7 and being tightened by mechanism of an associated nut in such a way that the slot 70 narrows, and as a result the clamp 72 fixes the holding ring 2 to the carrier 4.

As an alternative to using a clamping device 7 which is formed by a single clamp which runs in the form of a ring around the entire periphery of the holding ring 2 and the carrier 4, the clamping device 7 may also comprise a plurality of clamps which are spaced apart from one another in the periphery direction of the holding ring 2 and each fix a sub-section of the holding ring 2 to the carrier 4.

In the exemplary embodiment of a module assembly illustrated in FIG. 6, the carrier 4 has, at the outer edge, an overturned flange 46 which accommodates an angled-off end section 80 (securing section) of a housing part 8 which protrudes from the base body 40 of the carrier 4. This housing part 8 also includes a receiving section 82, in which the holding ring 2 together with the loop 12 of the airbag packet and the corresponding section 32 of the protective envelope 30 is accommodated in a positively locking manner, the holding ring 2 advantageously being elastically preloaded radially outwards in the direction of the receiving section 82. An end section 84, by way of which the housing part 8 encloses the airbag packet 1 in the shape of a ring, adjoins the receiving section 82 of the housing part 8.

The overturned flange 46 at the outer edge of the carrier 4, which engages around the securing section of the housing part 8, is preferably only formed after the airbag packet 1 and the holding ring 2 and then the housing part 8 have been placed on the carrier and positioned on it in such a manner that the holding ring 2 is engaged over or at least partially surrounded by the receiving section 82 of the housing part 8. The housing part 8 is to be oriented in such a manner that its securing section 80 runs along the edge of the carrier 4. Then, the housing part 8 is fixed to the carrier 4 by turning over the edge 46 of the carrier 4, and at the same time the holding ring 2 is also fixed to the carrier 4 by mechanism of the receiving section 82 of the housing part 8.

Another particular feature of the exemplary embodiment illustrated in FIG. 6 is that the carrier 4 is formed integrally on the gas generator G, in the manner of a generator flange. Accordingly, the gas generator G and the carrier 4 form an integrally molded assembly.

FIG. 7 shows a modification to the exemplary embodiment from FIG. 6; the difference is that a separate clamping device 86, for example of the type illustrated in FIGS. 5*a* and 5*b*, is used to connect the housing part 8 to the carrier 4, instead of an overturned flange 46 of the carrier 4. The clamping device 86 is either under elastic preloading to fix the housing part 8 to the carrier 4 or can be plastically deformed for this purpose.

Figure 8:
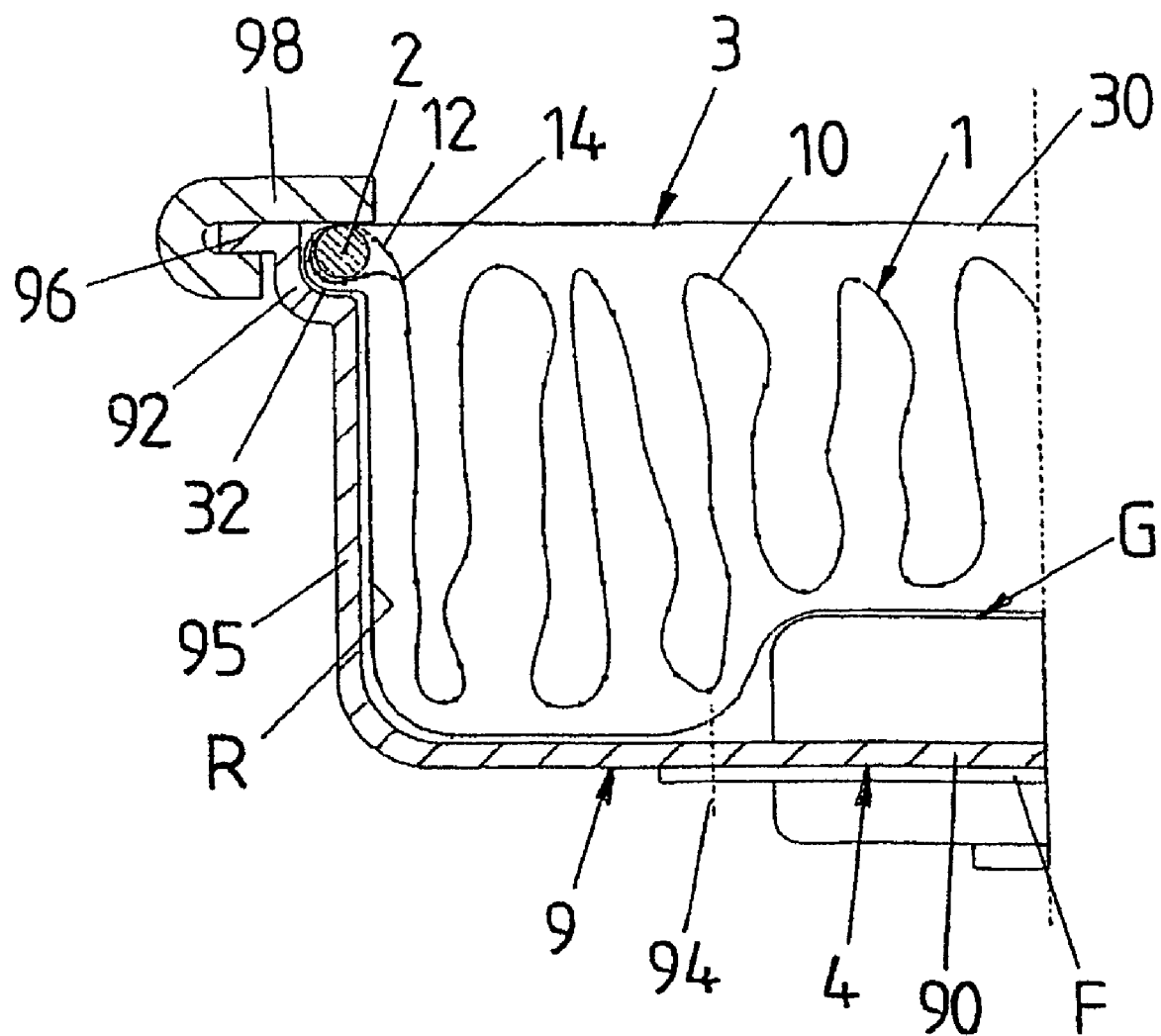
FIG. 8 shows a seventh modification to the exemplary embodiment shown in FIG. 1.

Finally, FIG. 8 shows an exemplary embodiment of a module assembly in which the generator carrier 4 is integrated in a cup-shaped housing bottom part 9, which accommodates the airbag packet 1, and is in this case formed by the base surface 90 of the housing bottom part 9. The gas generator G is secured to it via its generator flange F using suitable connecting mechanism 94.

A recess 92, in which the holding ring 2 together with the loop 12 of the airbag packet 1 and the corresponding section 32 of the protective envelope 3 is accommodated, is formed at the outer, lateral housing wall 95, which surrounds the airbag packet 1 in the form of a ring and projects (substantially vertically) from the base surface 90, in the region of the upper end, remote from the base surface 90.

In this case, the holding ring 2 is additionally delimited by a covering element 98, which together with the latching recess 92 forms a U-shaped receptacle for the holding ring 2 and which is fixed to a laterally projecting end section 96, forming a securing flange, of the housing bottom part 9 by being flanged over it.

One difference between the exemplary embodiment illustrated in FIG. 8 and the module assemblies illustrated with reference to FIGS. 1 to 7 is that according to FIG. 8 the mechanism 2, 92, 98 for fixing the airbag packet 1 to the carrier formed by the housing 9 are provided on the top side of the airbag packet 1, which is spaced apart from the gas generator G, whereas in the module assemblies illustrated in FIGS. 1 to 7 the mechanism for fixing the airbag packet 1 to the respective carrier engage on the lower end, facing the gas generator G, of the airbag packet 1.

Figure 9:
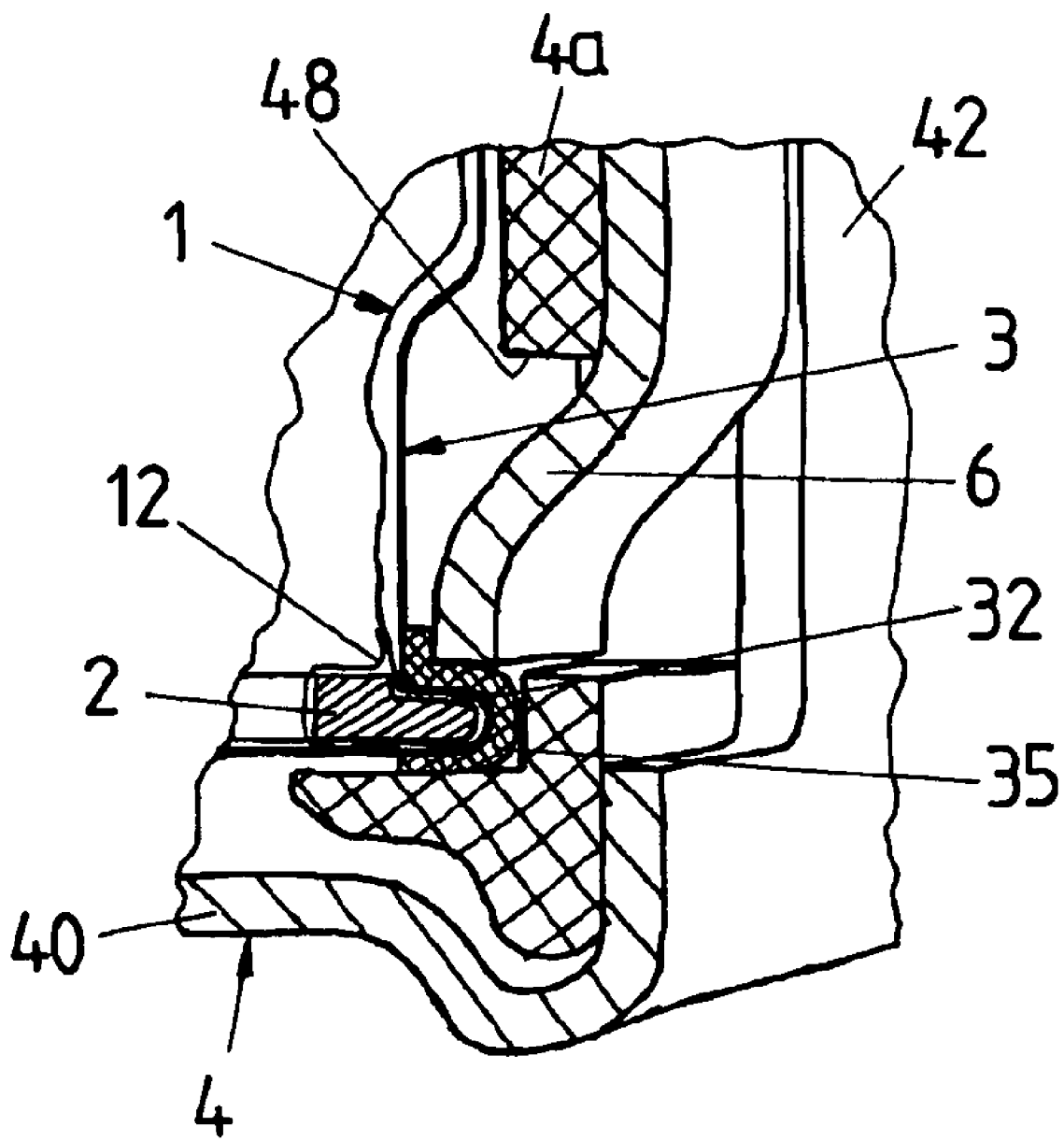
FIG. 9 shows a development of the exemplary embodiment shown in FIG. 3.

FIG. 9 shows an excerpt from a refinement of the exemplary embodiment from FIG. 3, specifically in the region of a holding ring 2 over which a clip element 6 engages as securing mechanism, these two components between them receiving a loop 12 of the airbag packet 1 laid around the holding ring 2 and an envelope section 32 which covers the loop 12. To protect the material of the airbag packet 1 and of the protective envelope 3 from being damaged in particular by the clip element 6, a cover 35, in the form of a flexible shrink-fit tube, which is matched to the outer contour of the holding ring 2 and covers the loop 12 of the airbag packet 1 and the envelope section 32 surrounding the loop 12, is arranged between the clip element 6, on the one hand, and the loop 12 of the airbag packet 1 as well as the associated envelope section 32, on the other hand.

In addition to the carrier 4 of the module assembly, FIG. 9 also illustrates a module cover 4*a*, which has an opening 48 through which the clip element 6 formed integrally on the carrier 4 projects toward the holding ring 2 received by the module cover 4*a*.

FIG. 10 shows an excerpt from a further way of fixing securing mechanism 7' which engage over a loop 12 of the airbag packet 1 and an associated envelope section 32 on the holding ring 2 by way of a securing section 71, on the carrier 4 of the module assembly. The latching mechanism comprise, on the securing mechanism 7', a first latching element 73 in the form of a sawtooth contour as well as a second latching element 77 in the form of a latching hook. The latter is assigned, on the base body 40 of the carrier 4, a latching opening 47, while the former, on the angled-off section 42 of the carrier 4, is assigned a matching sawtooth contour 43. This allows permanent, secure fixing of the securing mechanism 7' to the carrier 4 of the module housing at two spaced-apart latching points 43, 73, on the one hand, and 47, 77, on the other hand, the two latching points 43, 73; 47, 77 being located on sections 40, 42 of the carrier 4 which are angled off with respect to one another.

The five German priority applications: DE 10 2004 055 657.1 filed Nov. 15, 2004; DE 10 2004 056 128.1 filed Nov. 16, 2004; DE 20 2005 009 002.6 filed Jun. 3, 2005; DE 20 2005 010 863.4 filed Jun. 3, 2005; and DE 20 2005 010 864.2 filed Jul. 5, 2005, are all incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A module assembly for an airbag device for protecting occupants of motor vehicles, comprising:
   a carrier for the module assembly;
   an airbag packet which can be inflated to protect a vehicle occupant, the airbag packet being fixed to the carrier;
   a flexible protective envelope in which the airbag packet is accommodated, the protective envelope being closed off in a gastight manner; and
   a mechanism to fix the airbag packet to the carrier, the mechanism including a holding element extending along an edge of the airbag packet, and
   wherein a securing mechanism is provided on the carrier, and wherein the securing mechanism engages over the holding element to fix the airbag packet to the carrier, wherein the securing mechanism is configured to extend through an opening in a module cover and project toward the holding element, and
   wherein either the securing mechanism is formed integrally on the carrier and is resiliently pivotable with respect to a lateral section of the carrier, or the securing mechanism is fixed on the carrier as a separate assembly.

2. Module assembly according to claim 1, wherein the holding element is positioned in a loop of the airbag packet.

3. Module assembly according to claim 1, wherein the holding element is formed by a holding ring which extends in a shape of a ring around an edge of the airbag packet.

4. Module assembly according to claim 3, wherein the holding element extends as an uninterrupted holding ring around the edge of the airbag packet.

5. Module assembly according to claim 1, wherein the holding element comprises metal.

6. Module assembly according to claim 1, wherein the holding element comprises plastic.

7. Module assembly according to claim 1, wherein the holding element is elastically preloaded into a position in which the securing mechanism engages over the holding element.

8. Module assembly according to claim 1, wherein the holding element is surrounded by a section of the protective envelope.

9. Module assembly according to claim 8, wherein the holding element is positioned in a loop of the airbag packet, and wherein the section of the protective envelope surrounding the holding element also encloses the loop of the airbag packet.

10. Module assembly according to claim 1, wherein the securing mechanism engages around the holding element.

11. Module assembly according to claim 10, wherein the securing mechanism, together with the carrier, engages around the holding element.

12. Module assembly according to claim 1, wherein the securing mechanism holds the holding element in a non-positively locking manner.

13. Module assembly according to claim 1, wherein a covering element, which covers over the edge of the airbag packet and the flexible protective envelope, is arranged between the holding element and the securing mechanism.

14. Module assembly according to claim 13, wherein the cover is formed by a flexible shrink-fit tube.

15. Module assembly according to claim 1, wherein a covering element, which covers over the edge of the airbag packet or the flexible protective envelope, is arranged between the holding element and the securing mechanism.

16. Module assembly according to claim 1, wherein the carrier is a generator carrier.

17. Module assembly according to claim 16, wherein the carrier is integrally formed integrally with the gas generator.

18. Module assembly according to claim 1, wherein the carrier forms part of a housing for accommodating the airbag packet.

19. Module assembly according to claim 18, wherein a generator carrier is integrated in the carrier designed as a housing part.

20. Module assembly according to claim 1, wherein the carrier comprises metal.

21. Module assembly according to claim 1, wherein the carrier comprises plastic.

22. Module assembly according to claim 1, further comprising a covering element that is configured to be positioned between the flexible protective envelope and the securing mechanism.

23. Module assembly according to claim 22, wherein the covering element is configured to match the outer contour of the holding element.

24. A module assembly for an airbag device for protecting occupants of motor vehicles, comprising:
   a module cover;
   a carrier for the module assembly;
   an airbag packet which can be inflated to protect a vehicle occupant, the airbag packet being fixed to the carrier;
   a flexible protective envelope in which the airbag packet is accommodated, the protective envelope being closed off in a gastight manner; and
   a mechanism to fix the airbag packet to the carrier, the mechanism including a holding element extending along an edge of the airbag packet,
   wherein a securing mechanism is provided on the carrier, and wherein the securing mechanism engages over the holding element to fix the airbag packet to the carrier,
   wherein either the securing mechanism is formed integrally on the carrier and is resiliently pivotable with respect to a lateral section of the carrier, or the securing mechanism is fixed on the carrier as a separate assembly, and
   wherein a lateral end section of the carrier includes an opening into which the module cover and the holding element extend, and the securing mechanism is provided on the lateral end section of the carrier such that the opening in the carrier is positioned adjacent an end of the securing mechanism.

\* \* \* \* \*